Sept. 12, 1939.  A. W. GABEL  2,172,886
SHREDDING MACHINE
Filed Jan. 14, 1938  2 Sheets-Sheet 1

INVENTOR.
Albert W. Gabel
BY Hull, Brock & West
ATTORNEYS.

Sept. 12, 1939.     A. W. GABEL     2,172,886
SHREDDING MACHINE

Filed Jan. 14, 1938     2 Sheets-Sheet 2

INVENTOR.
Albert W. Gabel,
BY
ATTORNEYS

Patented Sept. 12, 1939

2,172,886

UNITED STATES PATENT OFFICE 2,172,886

SHREDDING MACHINE

Albert W. Gabel, Berea, Ohio

Application January 14, 1938, Serial No. 185,005

8 Claims. (Cl. 146—123)

Figure 1:
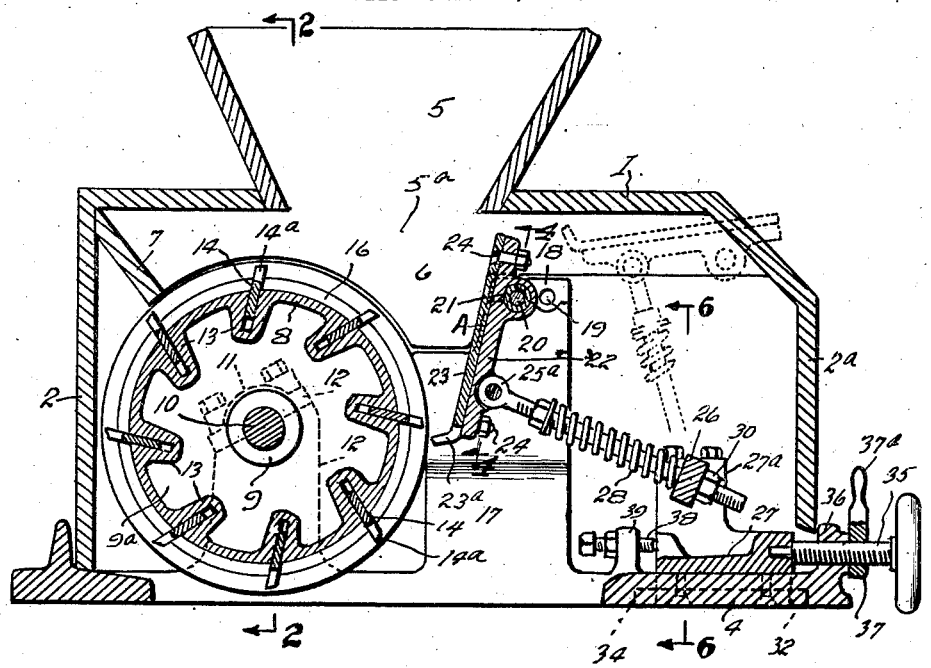
Figure 2:
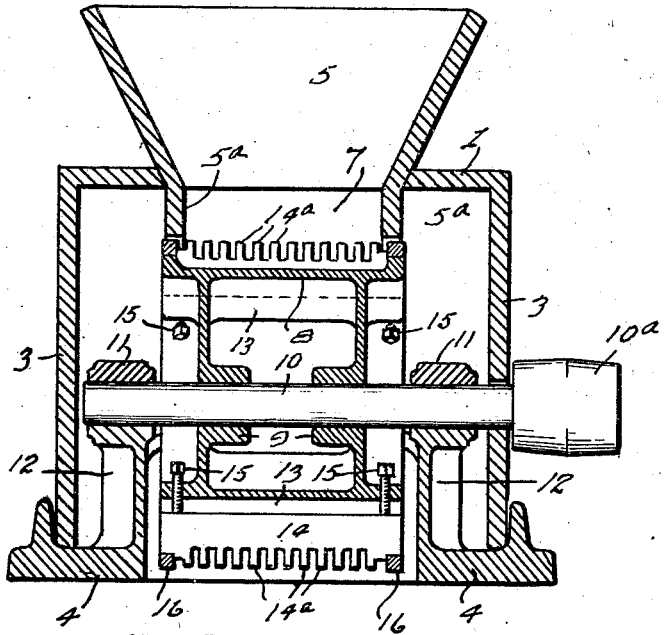
Figures 3, 4:
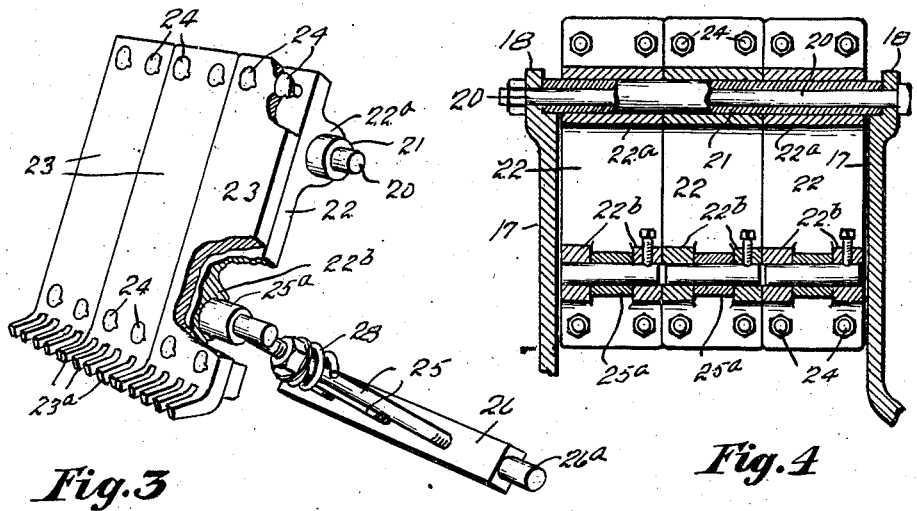
Figure 5:
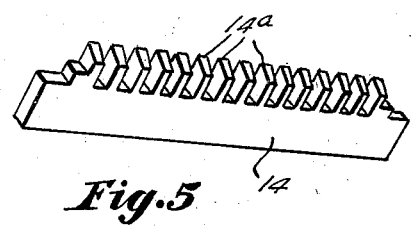
Figure 6:
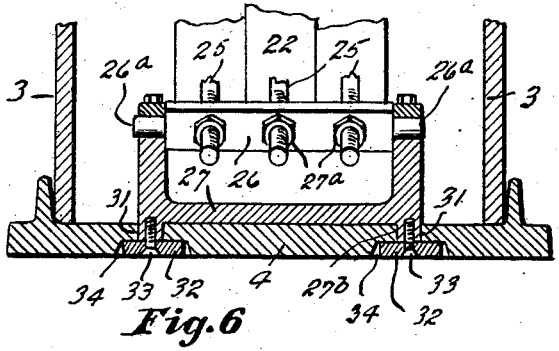

This invention relates to a machine for reducing articles, such as fruits, to a finely divided condition and has for its general object to provide a machine of this character which is particularly efficient for this purpose. Further and more limited objects of the invention will be set forth in the detailed description hereof and all of the objects of the invention will be realized by the construction and arrangement of parts shown in the drawings hereof, wherein Fig. 1 represents a central longitudinal sectional view through a machine constructed in accordance with my invention; Fig. 2 a sectional view corresponding substantially to the line 2—2 of Fig. 1; Fig. 3 a detail in perspective (with parts broken away) showing the knife-plates and the manner of mounting and assembling the same; Fig. 4 a detail in section corresponding substantially to the line 4—4 of Fig. 1; Fig. 5 a detail in perspective of one of the blades carried by the cylinder; and Fig. 6 a fragmentary sectional view corresponding substantially to the line 6—6 of Fig. 1, certain parts being omitted for clearness of illustration.

The machine disclosed herein consists generally of a housing having a hopper through which the fruit or other articles to be treated may pass into the housing and between a rotatable bladed cylinder therein and an assembly of knife-plates having their lower toothed ends projected toward the cylinder, the said assembly being pivotally mounted adjacent to the upper end thereof with the lower end thereof adjustably and yieldably supported.

Describing herein the various parts by reference characters, 1 represents the top, 2, 2ª the end walls, and 3 the side walls of a housing which is removably mounted upon the base 4. 5 denotes a hopper mounted in the top wall and arranged to discharge into a chute chamber 6, provided between the lower side extensions 5ª of the hopper and a wall 7 extending downwardly from the upper portion of the housing in proximity to the cylinder 8 and between the said cylinder and the knife assembly of knife plates (indicated generally at A).

The cylinder 8 is provided with hubs 9 by which it is supported by and is rotatable with a shaft 10 which is journaled in split bearings 11 supported by suitable standards or uprights 12 extending from the base 4. The cylinder is provided with inwardly projecting boxes 13, each having a slot 13ª therein for the reception of a blade 14. Each of the blades is provided with closely spaced teeth 14ª and is retained in its outward position within its box 13 by means of screws 15 (see Fig. 2) and by the rings 16 which are fitted over the ends of the cylinder and in engagement with which the ends of the blades are held by the screws 15, said screws being threaded through the outer end portions of the cylinder.

17 denotes standards or uprights, preferably formed integral with the base 4 and the uprights 12, each having a bracket 18 provided with a pair of longitudinally spaced cylindrical bearings 19, 20, the bearings 19 and 20 on each upright being directly opposite the corresponding bearings in the other upright, thereby to support in either of two positions a bolt 20 having a sleeve bushing 21 thereon. Upon this bushing are mounted the hubs 22ª carried by the backing plates 22 adjacent to the upper ends thereof. Each backing plate has a knife plate 23 secured to the front face thereof, by means of bolts 24. Each knife plate is provided with a plurality of closely spaced teeth 23ª projecting at nearly right angles therefrom toward the cylinder 8, slightly below a plane extending horizontally through the center thereof, and toward the ends of the blades carried thereby. The knife plates form in effect one of the lower walls of the hopper of which the cylinder forms the opposite wall, the teeth 23ª forming the bottom of the hopper.

Adjacent to its lower end, each of the backing plates is provided with a pair of laterally spaced lugs 22ᵇ each having a bore for the reception of a short rod 23, said rod being secured to one of the spaced lugs on each backing plate by means of a screw 24.

25 denotes a series of rods one for each backing plate and blade, each rod having a sleeve 25ª formed at its upper end and interposed between the lugs 22ᵇ of the corresponding backing plate, each of the said sleeves being mounted upon the appropriate rod 23. The lower ends of the rods 25 extend through a bar 26 which is provided at each end with a trunnion 26ª whereby the bar is rotatably mounted in split bearings 27ª carried by the upper ends of the sides of the slide 27. A spring 28 surrounds each of the rods 25, with one end bearing against the front or cylinder-facing side of the bar 26 and its other end bearing against a nut 29 threaded on its rod, whereby the resistance of each spring to the rearward movement of its cooperating knife and backing plate may be varied. Nuts 30, threaded on the lower ends of the rods 25, limit the movement of the knife plate assembly toward the cylinder by the springs 28.

The slide 27 is mounted for adjustment along the base 4 by means of longitudinally extending slots 31 in the base plate which receive the lower ends 27ᵇ of the sides of the slide, the said lower ends being secured to shoes 32 by screws 33, the said shoes being mounted in upwardly extending guides 34 in the base. The slide, together with the bar 26, may be moved toward and from the cylinder by means of a screw 35 threaded into and extending through the upright portion 36 of the bed, the said screw being connected with the slide 27.

The screw may be locked in position by means of a lock nut 37 having an operating handle 37', while the movement of the slide toward the cylinder may be variably limited by means of a screw 38, mounted in a suitable upright 39 carried by the base 4, and adapted to engage a suitable portion of the slide.

With the parts constructed and arranged as described, it is believed that the operation will be readily understood. The knife plate assembly having been journaled in either of the bearings 18 or 19 and having their lower ends adjusted so as to bring the ends of the teeth 23ª in as close proximity as desirable to the ends of the teeth on the blades 14, the shaft 16 is rotated, as by means of power applied to the pulley 16ª. In actual operation, the shaft is rotated very rapidly. This causes the blades to partially cut and at the same time to throw the apples or other fruit which may have been introduced into the hopper on top of the teeth 23ª which, owing to their inclination, constitute in effect the bottom of the hopper, while the knife plates and the opposite portion of the cylinder constitute opposed walls of the lower portion of the hopper. Practically all of the fruit is passed in a very finely reduced condition through the narrow space between the teeth 14ª on the blades 14 and the teeth 23ª. Whatever portions of the fruit may pass between the teeth on the blades and those on the knife plates will also be in an extremely finely reduced condition. Should any hard object, such as a stone, be admitted to the space between the blades and knives, the appropriate knife or knives and their backing plate or plates will be forced backwardly against the resistance of the spring or springs 28, thereby enabling the said object to pass through the machine without injuring the parts thereof.

By means of the slide and the screw 25, the space between the blades and knives may be adjusted as desired to compensate for wear or to adapt the same for operating upon different objects.

When it is desired to inspect the knife assembly or to effect the removal of a knife and the substitution of another for the same, this result may be effected by withdrawing the bolt 20, whereupon the assembly may be swung about the trunnions 26ª to a position such as indicated in dotted lines in Fig. 1, the cover, with attached hopper, being removed to permit this inspection and/or substitution.

Due to the construction and arrangement of parts shown herein, I have provided a machine for the purpose described which is extremely efficient in operation, enabling me to sub-divide the fruit or other materials subjected thereto to so fine a condition as to enable a maximum extraction of juice therefrom. Furthermore, by virtue of the construction and arrangement of the parts shown and described herein, I have produced a machine which will permit objects such as stones to pass therethrough without injury to the working parts, and which will permit the parts to be adjusted, inspected and removed in an extremely convenient and effective manner.

It will be obvious that the mechanism shown herein can be used for reducing to a fine condition materials other than fruits.

Having thus described my invention, what I claim is:

1. In a machine of the character described, the combination, with a rotatable cylindrical body provided with slotted boxes, of blades mounted in the slots of the said boxes and provided with teeth at the outer ends thereof, an assembly comprising a plurality of knife plates each having teeth at its lower end projecting toward the said cylinder, a backing plate to which each of said knife plates is secured, means common to the upper portions of all of said backing plates for pivotally supporting the same, rods each pivotally connected at one end to the lower portion of one of said backing plates, a slide, a bar having its ends pivotally supported by said slide and through which the opposite ends of said rods extend, a spring surrounding each of said rods and interposed between the said bar and the said plates, means for limiting the movement of the rods through the bar due to the action of said springs, and means for moving the slide toward and from the said cylindrical body.

2. In a machine of the character described, the combination, with a rotatable cylindrical body provided with slotted boxes, of blades mounted in the slots of the said boxes and provided with teeth at the outer ends thereof, an assembly comprising a plurality of knife plates each having teeth at its lower end projecting toward the said cylinder, a backing plate to which each of said knife plates is secured, means common to the upper portions of all of said backing plates for pivotally supporting the same, rods each pivotally connected at one end to the lower portion of one of said backing plates, a bar through which the opposite ends of said rods extend, a spring surrounding each of said rods and interposed between the said bar and the said blades, means for limiting the movement of the rods through the bar due to the action of said springs, and means for pivotally supporting the ends of said bar.

3. In a machine of the character described, the combination of a rotatable cylindrical body, blades carried by said body and projecting beyond the outer surface thereof, a knife plate pivotally supported adjacent to its upper end for movement about a horizontal axis and having its lower end in proximity to the said body, a rod connected at one end to the lower portion of said knife plate, a slide, a member supported by said slide and through which the other end of the said rod extends, a spring surrounding the said rod and bearing at one end against said member and yieldingly pressing the same and the lower portion of the knife plate toward the said body, and means for adjusting the slide toward and from the said body.

4. In the combination recited in claim 3, the member through which the rod extends being supported by the said slide for rotation about a horizontal axis.

5. In a machine of the character described, the combination, with a rotatable cylindrical body and a plurality of blades carried thereby, of a knife assembly comprising a plurality of backing plates, a knife plate carried by each of said backing plates and having teeth at its lower end deflected toward the said cylindrical body, each of said backing plates having a hub adjacent to its upper end, a bushing extending through all of said hubs, a rod extending through said bushing, and means for removably supporting the ends of said rod, a slide having side members, a bar having trunnions journaled in said side members to rotate about an axis substantially parallel with the axis of the said body, rods extending through the said bar and each pivotally connected to the lower portion of a backing plate, a spring surrounding each rod and yieldingly pressing the lower portion of each backing plate toward the said body, means for limiting the movement of the said rods and of the lower portions of said backing plates toward the said body, and means for adjusting the said slide toward and from the said body.

6. In a machine of the character described, the combination, with a rotatable cylindrical body and a plurality of blades carried thereby, of a knife assembly comprising a plurality of backing plates, a knife plate carried by each of said backing plates, each of said backing plates having a hub adjacent to its upper end, a rod extending through said hubs and means for removably supporting the ends of said rod, a bar having trunnions mounted to rotate about an axis substantially parallel with the axis of the said body, rods extending through said bar and each pivotally connected to the lower portion of the backing plate, a spring surrounding each rod and yieldingly pressing the lower portion of each backing plate toward the said body, and means for limiting the movement of the said rods and of the lower portions of said backing plates toward the cylindrical body.

7. In a machine of the character described, the combination, with a rotatable cylindrical body and a plurality of blades carried thereby, of a backing plate, removable means pivotally supporting the upper portion of the backing plate for movement about an axis substantially parallel with that of the said cylindrical body, a knife plate carried by said backing plate and having its lower end in proximity to the said body, a bar having trunnions mounted to rotate about an axis substantially parallel to the axis of said body, a rod extending through said bar and pivotally connected to the lower portion of said backing plate, a spring surrounding said rod and yieldingly pressing the lower portion of said backing plate toward the said body, and means for limiting the movement of the said rod and of the lower portion of said backing plate toward the said body.

8. In a machine of the character described, the combination, with a rotatable cylindrical body provided with blades extending substantially the full length thereof and projecting beyond the cylinder surface thereof, each blade having a plurality of closely spaced teeth thereon, of a hopper having its upper portion arranged above the said body, an assembly comprising a plurality of downwardly extending knife plates each pivotally supported adjacent to its upper end and each having teeth at its lower end projecting at nearly right angles therefrom toward the said body, the teeth on the knife plates being also closely spaced and having their ends in close proximity to the ends of the teeth of the blades as the latter are revolved together with the said cylindrical body, the ends of the teeth on the knife plates being located adjacent to a horizontal plane extending through the axis of rotation of the cylinder whereby the said assembly and the cylinder define opposite walls of the lower portion of the hopper while the teeth on the knife plates form the bottom wall of said hopper, means for rotating the cylinder, and means adjustable toward and from the cylinder for maintaining the lower ends of the teeth of said knife plates in a predetermined relation to the teeth of said blades, the last mentioned means being yieldable to permit a movement of the lower portion of each of said knife plates away from the cylindrical body.

ALBERT W. GABEL.